(12) United States Patent
Bertin

(10) Patent No.: US 6,668,515 B2
(45) Date of Patent: Dec. 30, 2003

(54) COMPOSITE JOINT FOR FITTING AT LEAST ONE EXTERNAL MEMBER TO A SANDWICH PANEL AND PANEL INTEGRATING AT LEAST ONE SUCH JOINT

(75) Inventor: André Bertin, Vedrin (BE)

(73) Assignee: Sonaca S.A., Gosselies (BE)

( * ) Notice: Subject to any disclaimer, the term of this patent is extended or adjusted under 35 U.S.C. 154(b) by 76 days.

(21) Appl. No.: 09/738,476

(22) Filed: Dec. 15, 2000

(65) Prior Publication Data

US 2001/0003888 A1 Jun. 21, 2001

(30) Foreign Application Priority Data

Dec. 17, 1999 (BE) .............................................. 9900817

(51) Int. Cl.[7] ................................................. E04C 2/38
(52) U.S. Cl. ...................... 52/793.1; 52/783; 52/787.1; 52/782.1
(58) Field of Search ............................. 52/782.1, 793.1, 52/787.12, 783, 787.1

(56) References Cited

U.S. PATENT DOCUMENTS

| | | | | |
|---|---|---|---|---|
| 3,579,942 A | * | 5/1971 | Cole | 411/113 |
| 3,742,663 A | * | 7/1973 | Duskin | 428/178 |
| 3,977,146 A | * | 8/1976 | Wiley | 16/2.1 |
| 4,845,915 A | * | 7/1989 | Rogers et al. | 52/783 |
| 5,116,689 A | * | 5/1992 | Castro et al. | 156/292 |
| 6,165,588 A | * | 12/2000 | Wycech | 293/109 |

FOREIGN PATENT DOCUMENTS

GB 2197618 A * 5/1988

OTHER PUBLICATIONS

WO 97/26958, Binding Anchor, Jul. 31, 1997.

* cited by examiner

Primary Examiner—Carl D. Friedman
Assistant Examiner—Basil Katcheves
(74) Attorney, Agent, or Firm—Pearne & Gordon LLP (57) ABSTRACT

Composite joint for fitting at least one external member to a sandwich panel and panel integrating at least one such joint.

To permit the transmission of static and/or dynamic stresses between at least one external member and a sandwich panel, into said panel is integrated at least one composite joint (10). Said joint comprises a plurality of juxtaposed, elementary, tubular cells (12), oriented in the panel thickness direction, as well as at least one stress introduction cell (12a), in which is fitted a rigid part (14) for fixing the external member. The tubular cells (12) comprise composite walls formed from braided fiber roves and resin.

15 Claims, 3 Drawing Sheets

COMPOSITE JOINT FOR FITTING AT LEAST ONE EXTERNAL MEMBER TO A SANDWICH PANEL AND PANEL INTEGRATING AT LEAST ONE SUCH JOINT

TECHNICAL FIELD

The invention relates to a composite junction or joint for integration into a sandwich panel so as to permit the fitting of at least one external member to said panel.

In particular, the composite joint according to the invention is designed for permitting the transmission of high static and/or dynamic stresses between a sandwich panel and one or more members fixed to said panel.

The invention also relates to a sandwich panel integrating one or more composite joints of this type.

A preferred application of the invention is in the aeronautical and space industries. However, it can be used in other technical fields without passing outside the scope of the invention.

PRIOR ART

Sandwich panels are used in numerous industries, particularly due to their lightness and their considerable rigidity, particularly flexural rigidity.

A sandwich panel is formed from a cellular core and two covering layers positioned on either side thereof. The cellular core is generally in the form of a honeycomb or foam structure. This configuration leads to a significant weight gain compared with a homogeneous structure having the same rigidity. As a function of the intended use, the covering layers and the cellular core are metallic and/or composite and/or synthetic.

It is known in the aeronautical industry to use sandwich panels for e.g. forming the floors of cabins, internal partitions and wing elements. Such panels are also used in the space industry, where the weight reduction requirement is imperative. High stresses are then transmitted to the structures during the take-off phases. In addition, high thermal stresses are present, due to the high temperature gradient existing between the shady areas and the sunny areas.

It is also known that a composite material partly formed from resin gives off into space the water present in its structure, which has the effect of causing displacements liable to modify the position of instruments or equipments mounted on the panel.

When a random external member is mounted on a sandwich panel, the joint must be such that it transmits to the coverings and to the core of the panel stresses of all types without giving rise to a fracture or permanent deformations. Moreover, the service life of the joint must be compatible with the sought service life for the panel.

To produce such a joint, one known solution consists of integrating into the panel a monolithic, connected part of a random shape, which is normally made from metal and which is known as a insert. Said insert is dimensioned so as to receive the stresses and spread them to the panel.

Inserts conventionally used for ensuring the junction between an external member and a sandwich panel may either pass completely through the panel or may be non-issuing. In the latter case, the insert is generally included in the panel prior to the bonding of the coverings to the cellular core. When the insert traverses the panel, it is generally placed in a cavity machined in at least one of the coverings and in the core of the panel. The fixing of the insert in the cavity is then ensured by a solidified material such as a resin or a foaming film. In exemplified manner, U.S. Pat. Nos. 5,240,543, 5,378,099, FR-A-1 243 582, FR-A-1 132 264 and FR-A-2 452 021 relate to different types of inserts completely traversing a sandwich panel.

When this conventional procedure is used, the mechanical performance characteristics of the inserts can be optimized by giving them an external contour for fastening the resin. In addition, the dimensions of the cavity in which the insert is housed take account of the shape thereof and the stresses transmitted through the joint or junction. Thus, the perimeters of the cavity and the insert are chosen as a function of shear stresses, which must be transmitted by the interface between the insert and the panel, in order that the stress level remains acceptable for the materials used.

This conventional joining procedure suffers from a certain number of disadvantages.

Thus, the respecting of the different parameters referred to hereinbefore generally leads to the use of inserts having relatively large dimensions, whose weight, increased by that of the fixing resin, significantly increases the weight of the sandwich panel. This phenomenon is particularly sensitive when a single insert integrates several fixing points.

Moreover, the area materialized by the insert has different physical properties from those of the remainder of the sandwich panel. The resulting discontinuity gives rise to a distortion in the deformations of the panel, particularly in the case where the latter is subject to thermal stresses. This discontinuity is particularly prejudicial in the case of a large, monolithic insert.

Sandwich panels are also known, whose cellular core is formed from juxtaposed, tubular cells constituted by braided fibre roves, as disclosed in the document "Composite Airframe Structure" published in September 1995, pp 270/271. In such a panel the cells are juxtaposed in the longitudinal direction, i.e. parallel to the panel covering layers and form the entire panel core. A panel constructed according to said document is only able to receive a load uniformly distributed over its whole surface.

DESCRIPTION OF THE INVENTION

The object of the invention is a composite junction or joint, whose original configuration enables it to ensure the progressive transmission of stresses between a relatively rigid, external member and a significantly less rigid, cellular core of a sandwich panel, whilst giving a considerable dimensional stability in the presence of thermal and/or hygroscopic stresses.

According to the invention, this result is obtained by means of a composite joint for the fitting of at least one external member to a sandwich panel comprising a cellular core and two covering layers placed on either side thereof, said joint being characterized in that it comprises a plurality of juxtaposed, elementary, tubular cells orientable in the thickness direction of the panel within a recess formed in the core of the sandwich panel and at least one stress introduction cell in which is housed at least one rigid part for fixing said external member, each stress introduction cell being separated from a peripheral edge of the joint, in all directions, by at least one elementary, tubular cell.

In a composite joint designed in this way, it is possible to adapt the cross-section and size of the tubular cells, their number and thickness, as well as the orientation of the partitions as a function of the intensity and orientation of the stresses which have to be transmitted between the rigid part and the cellular core of the panel, e.g. in such a way that the rigidity of the joint evolves progressively between the rigid part and the core of the panel. By comparison with a conventional, one-piece insert used under the same conditions, the composite joint according to the invention is placed in a cavity having essentially the same dimensions. The rigid part, which can in particular be metallic, is consequently much smaller and therefore less heavy than a conventional insert. Thus, the composite joint according to the invention leads to a weight gain, which can reach approximately 50% as a function of the particular application.

In a preferred embodiment of the invention, each of the elementary, tubular cells comprises a composite wall formed from braided fibre roves and resin. The elementary, tubular cells, which form most of the composite joint, can therefore be produced from a combination of intrinsically stable materials (fibres, e.g. of carbon, which are thermally stable and resin, which is stable from the water-solidification standpoint). Moreover, the consequences of a possible desorption in vacuo are very limited, because the joint contains a small resin volume compared with the fibre volume and a resin having a high hygroscopic stability can be chosen. The resulting composite joint consequently has a dimensional stability far superior to that of a conventional insert.

In the preferred embodiment of the invention, the juxtaposed, elementary, tubular cells are separated by partitions, each comprising two composite walls interconnected by resin. In order to arrive at this result, it is possible to manufacture the joint using resin transfer moulding or RTM. Dry fibre preforms corresponding to the elementary, tubular cells are then placed in a mould. The joint is obtained by injecting a resin under pressure into the mould and then polymerizing said resin.

To ensure an effective stress transmissions, the partitions separating the juxtaposed, elementary, tubular cells are aligned in at least two stress transmission directions.

Preferably, the separating partitions of the juxtaposed, elementary, tubular cells form planes orientable perpendicular to the covering layers of the sandwich panel.

In a non-limitative, special embodiment according to the invention, at least some of the elementary, tubular cells have a square cross-section.

In this case, the elementary, tubular cells having a square cross-section, whereof a diagonal passes through a stress introduction cell, can advantageously comprise an internal partition oriented in accordance with said diagonal.

The rigid part, which can be metallic or made any other appropriate material is connected in preferred manner to the stress introduction cell by resin. When the joint is produced by the RTM method, the rigid part is then integrated into the joint during moulding.

The external member can be fixed to the rigid part either directly, or by means of an appropriate, randomly shaped, connecting part. In all cases, the rigid part can comprise a fixing hole oriented in a longitudinal direction with respect to the stress introduction cell.

The invention also relates to a sandwich panel incorporating one or more composite joints of this type.

BRIEF DESCRIPTION OF THE DRAWINGS

The invention is described in greater detail hereinafter relative to non-limitative embodiments and the attached drawings, wherein show.

DETAILED DESCRIPTION OF PREFERRED EMBODIMENTS OF THE INVENTION

Figure 1:
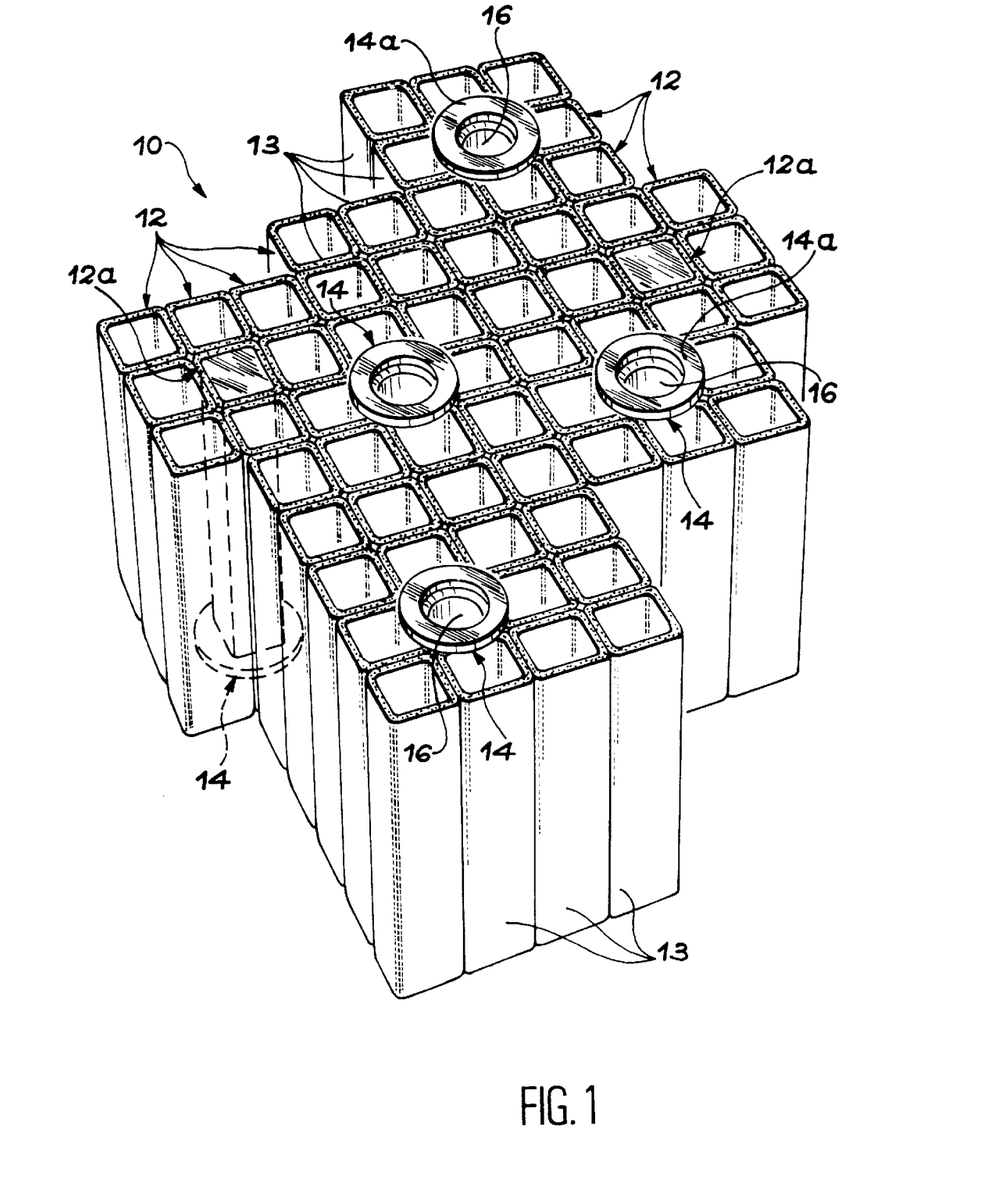
FIG. 1 A perspective view illustrating in isolation a composite joint according to the invention.

FIG. 1 shows in exemplified manner a first embodiment of a composite junction or joint according to the invention. This composite joint, designated in general terms by the reference numeral 10, comprises a plurality of elementary, tubular cells 12, juxtaposed in parallel to one another so as to form a plate having a uniform thickness, in which the elementary, tubular cells 12 are oriented perpendicular to the plane of said plate. As will become clearer hereinafter, the shape and dimensions of the plate formed by the juxtaposed, elementary, tubular cells 12 is dependent on the number and location of the fixing points provided in the joint 10.

Each of the elementary, tubular cells 12 is in the form of a tube section, whose length corresponds to the thickness of the plate and whose cross-section is square in the embodiment shown.

In practice, the tube sections forming the elementary, tubular cells 12 are produced from a dry, tubular preform obtained by braiding fibre roves on a mandrel, whose cross-section is complimentary to that of the elementary, tubular cells 12. Therefore the cross-section of said mandrel is square in the embodiment shown in FIG. 1. The thus obtained, tubular preform is then cut into sections of equal length, said length being equal to the thickness of the plate to be produced.

During a subsequent phase of the production of the composite joint 10, the tube sections are juxtaposed in the cavity of a mould. Said cavity has the shape of the composite joint 10 to be produced. Soluble or dismantlable cores are placed inside the tube sections during the braiding process. Optionally, a core can be fitted or replaced after braiding. In addition, a rigid part 14 is fitted at the location of each of the tube sections 12 or within the latter, at points which are to serve as fixing points. The cells containing the rigid parts 14 in the composite joint 10 are referred to as "stress introduction cells" and designated by the reference 12a in the remainder of the text. Thus, each stress introduction cell 12a can be defined by a tube section individual to said cell or by the walls of adjacent tube sections.

The mould is then closed and a resin is injected under pressure into the interior thereof in accordance with the RTM method. The injection under pressure of the resin has the effect of impregnating the walls of the tube sections formed by braided fibre roves. The resin is then polymerized and then the mould is opened and the composite joint 10 is extracted therefrom.

In the thus obtained composite joint 10, the composite wall 13 of each of the elementary, tubular cells 12 is formed from braided fibre roves and resin. The juxtaposed, elementary, tubular cells 12 are separated by partitions, each of which comprises two composite walls 13 interconnected by resin.

As is illustrated in FIG. 1, the composite joint 10 is produced in such a way that the partitions separating the juxtaposed, elementary, tubular cells 12 are aligned in two different transmission directions, which are orthogonal to one another and to the plane of the plate.

It should be noted that this particular orientation of the partitions separating the cells 12 results from the square cross-section of said cells. The use of cells having different cross-sections, e.g. in the form of lozenges or triangles, will lead to different orientations of the separating partitions of said cells. It should also be noted that the composite joint 10 according to the invention may comprise elementary, tubular cells 12 having at least two different cross-sections in the complete joint.

As is more particularly illustrated by FIG. 1, each of the stress introduction cells 12a is placed in the composite joint 10 in such a way that said cell 12a is separated from the peripheral edges of the joint and other stress introduction cells 12a by at least one elementary, tubular cell 12, in all directions. In other words, each of the stress introduction cells 12a is surrounded in all directions by at least one elementary, tubular cell 12 not containing a rigid part 14. This feature ensures that the stress applied to the joint 10 through any random one of the rigid parts 14 will pass through at least one elementary, tubular cell 12 before being transmitted to the sandwich panel into which the composite joint 10 is to be integrated.

Externally each of the rigid parts 14 has a shape complimentary to that of the stress introduction cell 12a in which said part is received. When the rigid parts 14 are inserted in the stress introduction cells 12a prior to the performance of the RTM method, as described hereinbefore, the rigid parts 14 are connected to the walls of the stress transmission cells 12a by resin injected into the mould.

As a variant, the rigid parts 14 can also be placed in the stress introduction cells 12a following the manufacture of the plate. They are then fixed in the stress introduction cells, e.g. by bonding or any other means guaranteeing an effective and reliable transmission of stresses.

In the embodiment illustrated in exemplified manner in FIG. 1, the composite joint 10 comprises six stress transmission points materialized by six stress introduction cells 12a, each containing a rigid part 14. More specifically, four of the rigid parts 14 are provided for ensuring the fixing of an external member to the upper face of the joint when considering FIG. 1. The two other rigid parts 14 will serve for fixing to another external member fixed to the lower face of the joint. As a function of the envisaged application, the number of members to be fixed to the same joint 10 and the number of rigid parts 14 can be random exceeding or equal to 1. Thus, FIGS. 2 and 3 illustrate the case where the joint 10 comprises a single rigid part 14.

Figure 2:
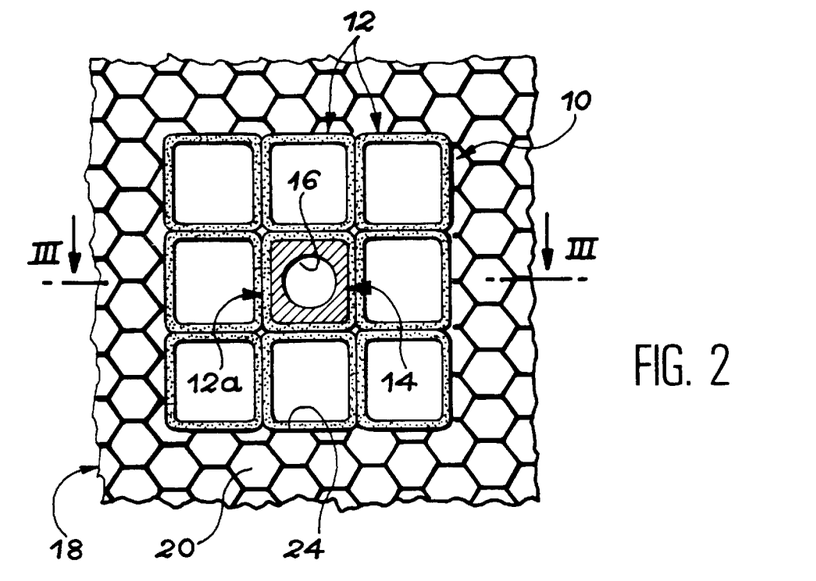
FIG. 2 A plan view in cross-section of another embodiment of a composite joint according to the invention integrated into a sandwich panel, the upper covering of the panel being deliberately omitted.
Figure 3:
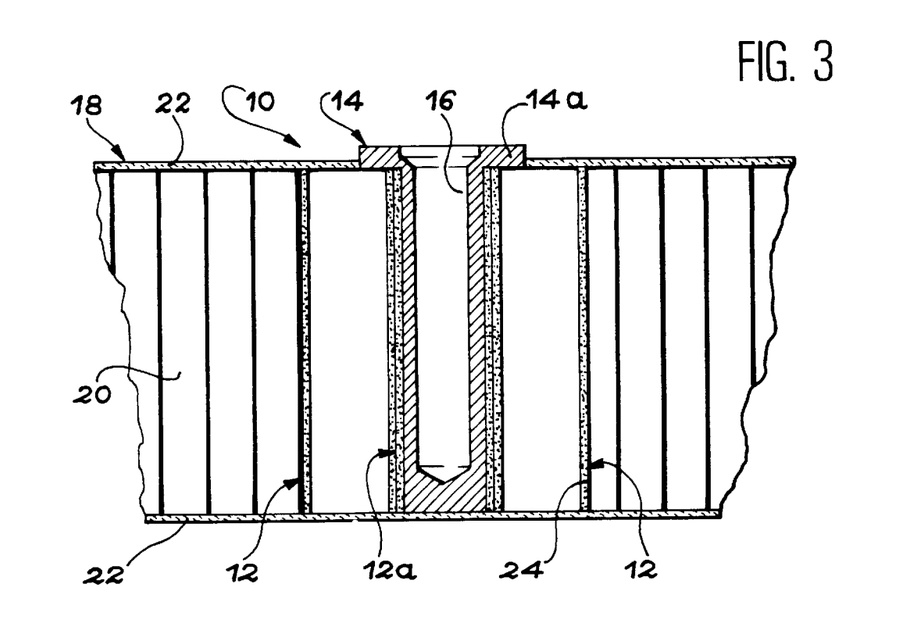
FIG. 3 A sectional view along line III—III of FIG. 2.

In the embodiments illustrated in FIGS. 1 to 3, each of the rigid parts 14 comprises a fixing hole 16, oriented in a longitudinal direction with respect to the stress introduction cell 12a containing the rigid part. Usually use is made of an issuing fixing hole 16 in order to save weight and avoid trapping of an air bubble in the space sector. At one end of the hole 16, the rigid part 14 can optionally have a flange 14a projecting over the corresponding face of the plate and bearing on the ends of the adjacent, elementary, tubular cells 12.

The closed end of each of the rigid parts 14 is flush with the opposite face of the plate. Advantageously, the blind fixing hole 16 made in each of the rigid parts 14 is a tapped hole, into which can be screwed a threaded rod for fixing the external member.

It should be noted that as a variant, the rigid parts 14 for fixing an external member can have a different configuration, without passing outside the scope of the invention. Thus and solely in exemplified manner, instead of having a fixing hole, each rigid part can be provided with a threaded rod projecting over the face of the plate to which the external member is to be fixed.

As is more particularly illustrated in FIGS. 2 and 3, the composite joint 10 according to the invention is intended to be integrated into a conventionally designed, sandwich panel 18, so as to permit the fitting of at least one external member to said panel.

In conventional manner, the sandwich panel 18 comprises a cellular core 20 and two covering layers 22 placed on either side of the cellular core 20. The core 20 of the sandwich panel 18 usually has a honeycomb structure, as illustrated in FIGS. 2 and 3. However, it can also be a foam having closed or open cells. The materials used in the composition of the core 20 and coverings 22 of the sandwich panel 18 can be metallic and/or composite and/or synthetic, as a function of the envisaged application.

As is illustrated in FIG. 3, the thickness of the plate forming the composite joint 10 is equal to the thickness of the cellular core 20 of the sandwich panel 18 into which said joint is to be integrated.

For placing the composite joint 10 in the sandwich panel 18, in the core 20 is machined a recess 24 having a complimentary shape to that of the joint 10, prior to the fitting of the coverings 10. This is followed by the introduction of the composite joint 10 into the recess 24, after which the coverings 22 are fitted, so that the latter entirely cover the joint 10, with the exception of the flanges 14a of the rigid parts 14. More specifically, the joint 10 is bonded to the coverings 22 and a foaming film or resin is injected between the joint and the core 20, once the panel has been finished.

At the end of the integration of the composite joint 10, the elementary, tubular cells 12 thereof are oriented perpendicular to the covering layers 22 of the sandwich panel 18. This also applies to the fixing holes 16 formed in the parts 14. Consequently when a random, external member is fixed to the rigid parts 14, e.g. by means of screws, the stresses applied to the external member are transmitted to the panel by the composite joint 10, through partitions separating the elementary, tubular cells 12 of the joint.

Thus, by giving the elementary, tubular cells 12 of the composite joint 10 and the partitions separating said cells shapes and dimensions adapted to the stresses to be transmitted, it is possible to ensure an effective, reliable transmission of said stresses, whilst still benefiting from a significant reduction in the weight of the joint as compared with a conventional joint using a one-piece insert. More specifically, the weight of the composite joint according to the invention can be approximately half the weight of a prior art, one-piece joint.

As most of the composite joint according to the invention is not metallic (only the rigid parts 14 may possibly be metallic) and due to the fact that it contains a small resin volume compared with the fibre volume and it is possible to choose a resin having a high hygroscopic stability, the joint according to the invention is virtually insensitive to thermal stresses. It consequently has a high dimensional stability when the application imposes high thermal and/or hygroscopic stresses, as is e.g. the case in the space sector.

As has already been stated, the number of rigid parts 14 integrated into the composite joint 10, as well as the shape of at least some of the elementary, tubular cells 12 can differ from those described in the embodiments illustrated in FIGS. 1 to 3.

Figure 4:
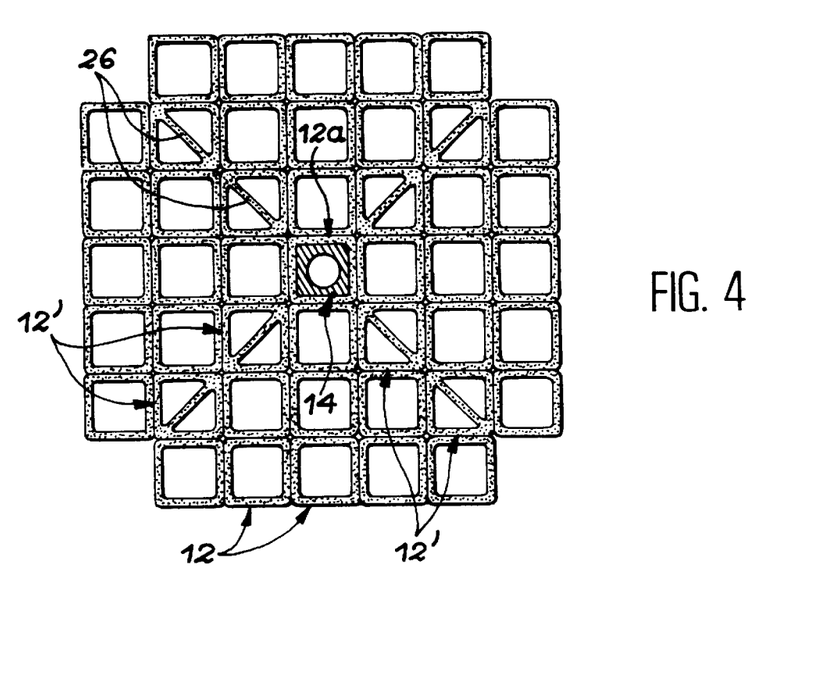
FIG. 4 A plan view, in cross-section, of another embodiment of a composite joint according to the invention.

Thus, FIG. 4 shows the case of a composite joint comprising a single rigid part 14 placed in its centre. Moreover, although most of the elementary, tubular cells 12 have a square cross-section, those having a diagonal passing through the stress introduction cell 12a, which are designated by the reference 12' in FIG. 4, have an internal partition 26 oriented in accordance with said diagonal.

Figure 5:
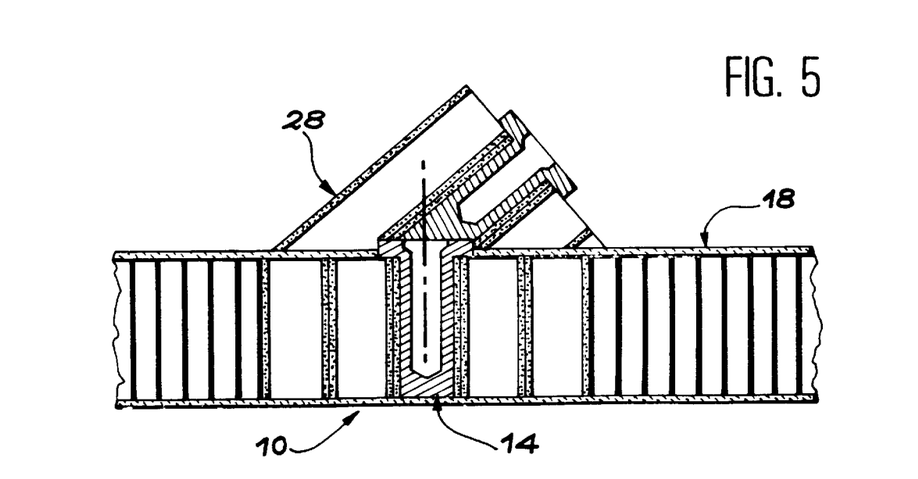
FIG. 5 A sectional view comparable to FIG. 3, illustrating the use of a connecting part between the rigid part of the insert and the external member.

In addition and as illustrated in FIG. 5, the external member may not be directly fixed to the composite joint 10 and can instead be fixed thereto by means of a connecting part 28. This connecting part is then fixed to the rigid part or parts 14 of the composite joint 10, e.g. by means of screws. The external member, which can in particular be constituted by a not shown rod oriented in accordance with an inclined direction with respect to the plane of the sandwich panel 18, is then fixed to the connecting part 28 by any appropriate means, such as e.g. by screwing.

In this case, it should be noted that the connecting part 28 can have a structure comparable to that of the composite joint 10, as shown in FIG. 5.

What is claimed is:

1. Composite joint for the fitting of at least one external member to a sandwich panel comprising a cellular core and two covering layers placed on either side thereof, said joint comprising:
   a plurality of juxtaposed, elementary, tubular cells orientable in the thickness direction of the panel, within a recess formed in the core of the sandwich panel, and
   at least one stress introduction cell which houses a rigid part for fixing said external member, each stress introduction cell being separated from a peripheral edge of the joint, in all directions, by at least one elementary, tubular cell,
   wherein each of the elementary, tubular cells has a composite wall formed from braided fibre roves and resin, and wherein a planar cross-section of the stress introduction cell and the plurality of juxtaposed, elementary, tubular cells is substantially arranged as a tesselation.

2. Composite joint according to claim 1, wherein the juxtaposed, elementary, tubular cells are separated by partitions, each having two composite walls connected to one another by resin.

3. Composite joint according to claim 2, wherein the partitions separating the juxtaposed, elementary, tubular cells are aligned in at least two different stress transmission directions.

4. Composite joint according to claim 2, wherein the partitions separating the juxtaposed, elementary, tubular cells form planes orientable perpendicular to the covering layers of the sandwich panel.

5. Composite joint according to claim 1, wherein at least some of the elementary, tubular cells have a square cross-section.

6. Composite joint according to claim 5, wherein the elementary, tubular cells having a square cross-section, whereof a diagonal passes through a stress introduction cell, comprise an internal partition oriented in accordance with said diagonal.

7. Composite joint according to claim 1, wherein said rigid part is connected to the stress introduction cell by resin.

8. Composite joint according to any one of the preceding claims, wherein said rigid part comprises a fixing hole oriented in a longitudinal direction with respect to the stress introduction cell.

9. Sandwich panel comprising:
   a cellular core;
   two covering layers placed on either side of the core; and
   at least one composite joint for the fitting of at least one external member to said panel, said joint comprising:
      a plurality of juxtaposed, elementary, tubular cells orientable in the thickness direction of the panel, within a recess formed in the core of the sandwich panel, and
      at least one stress introduction cell housing a rigid part for fixing said external member, each stress introduction cell being separated from a peripheral edge of the joint, in all directions, by at least one elementary, tubular cell,
   wherein each of the elementary, tubular cells has a composite wall formed from braided fibre roves and resin, and wherein a planar cross-section of the stress introduction cell and the plurality of juxtaposed, elementary. tubular cells is substantially arranged as a tesselation.

10. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in each recess, for the fitting of at least one external member to said panel, said composite joint having a shape complementary to that of said recess and including a plurality of juxtaposed, elementary, tubular cells oriented in the thickness direction of the panel, each of said cells having a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part.

11. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in each recess, for the fitting of at least one external member to said panel, said composite joint having a shape complementary to that of said recess and including a plurality of juxtaposed, elementary, tubular cells oriented in the thickness direction of the panel, each of said cells having a square cross-section and a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part.

12. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in each recess, for the fitting of at least one external member to said panel, said composite joint having a shape complementary to that of said recess and including a plurality of juxtaposed, elementary, tubular cells oriented in the thickness direction of the panel, each of said cells having a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part, and wherein each of said cells comprises a composite wall of square cross-section, adjacent composite walls of said cells being connected to one another by resin, thereby defining plane partitions aligned in two perpendicular stress transmission directions orthogonal to said thickness direction.

13. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in each recess, for the fitting of at least one external member to said panel, said composite joint having a shape complementary to that of said recess and including a plurality of juxtaposed, elementary, tubular cells oriented in the thickness direction of the panel, each of said cells having a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part, and wherein each of said cells comprises a composite wall of square cross-section, adjacent composite walls of said cells being connected to one another by resin, thereby defining plane partitions aligned in two perpendicular stress transmission directions orthogonal to said thickness direction, said rigid part having a square cross-section complementary to said one cell and being connected to said one cell by a resin.

14. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in, each recess, for the fitting of at least one external member to said panel, said composite joint having a shape complementary to that of said recess and including a plurality of juxtaposed, elementary, tubular cells oriented in the thickness direction of the panel, each of said cells having a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part, and wherein said rigid part has a cross-section complementary to said one cell, and is connected to said one cell by resin, said rigid part comprising a blind fixing hole oriented along said thickness direction and opening on a first side of the composite joint, a first of said layers covering said first side of the composite joint, except said rigid part, and the other of said layers fully covering the other side of the composite joint.

15. A sandwich panel comprising a cellular core having two sides defining a given thickness therebetween and two covering layers placed on said two sides of the cellular core, at least one recess formed in said cellular core, said recess extending from one of said sides to the other and having a given shape, and a composite joint received in each recess, for the fitting of at least one external member to said panel, said composite joint having a shape complementary to that of said recess and including a plurality of juxtaposed, elementary, tubular cells oriented in the thickness direction of the panel, each of said cells having a composite wall formed from braided fibre roves and resin, wherein at least one of said cells houses a rigid part adapted to secure said external member, said one cell housing said rigid part being separated from the cellular core, in all directions, by at least one elementary cell which does not house a rigid part, and wherein each of said cells comprises, a composite wall of square cross-section, adjacent composite walls of said cells being connected to one another by resin, thereby defining plane partitions aligned in two perpendicular stress transmission directions orthogonal to said thickness direction, said rigid part having a square cross-section complementary to said one cell and being connected to said one cell by a resin, and said rigid part including a blind fixing hole oriented along said thickness direction one opening an a first side of the composite joint, adapted to receive said external member.

* * * * *

UNITED STATES PATENT AND TRADEMARK OFFICE
CERTIFICATE OF CORRECTION

PATENT NO.    : 6,668,515 B2
DATED         : April 8, 2004
INVENTOR(S)   : Andre Bertin It is certified that error appears in the above-identified patent and that said Letters Patent is hereby corrected as shown below:

<u>Column 8,</u>
Lines 16-17, "… elementary. Tubular cells…" should read -- … elementary, tubular cells… --

Signed and Sealed this

First Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO.      : 6,668,515 B2                                          Page 1 of 1
DATED           : December 30, 2003
INVENTOR(S)     : Andre Bertin

It is certified that error appears in the above-identified patent and that said Letters Patent is hereby corrected as shown below:

<u>Column 8,</u>
Lines 16-17, "… elementary. Tubular cells…" should read -- … elementary, tubular cells… --

This certificate supersedes Certificate of Correction issued June 1, 2004.

Signed and Sealed this

Nineteenth Day of July, 2005

JON W. DUDAS
*Director of the United States Patent and Trademark Office*